(No Model.)
J. M. TRYON.
VELOCIPEDE.
No. 329,102. Patented Oct. 27, 1885.
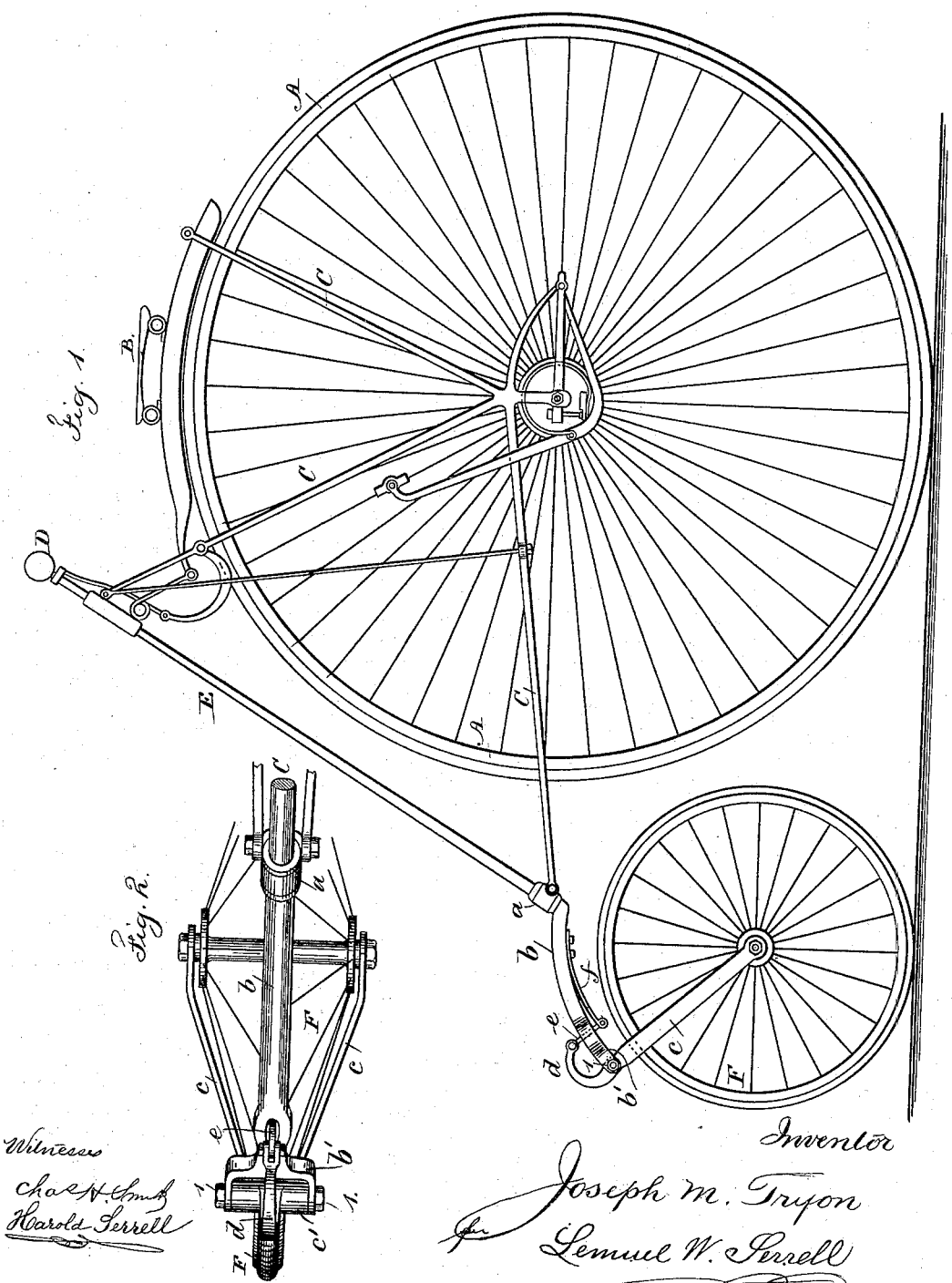
Witnesses
Chas. H. Smith
Harold Serrell
Inventor
Joseph M. Tryon
Lemuel W. Serrell
atty

UNITED STATES PATENT OFFICE.

JOSEPH M. TRYON, OF WEST FARMS, NEW YORK.

VELOCIPEDE.

SPECIFICATION forming part of Letters Patent No. 329,102, dated October 27, 1885.

Application filed September 9, 1885. Serial No. 176,550. (No model.)

*To all whom it may concern:*

Be it known that I, JOSEPH M. TRYON, of West Farms, in the county and State of New York, have invented a new and useful Improvement in Bicycle and Tricycle Steering-Wheels; and the following is declared to be a description of the same.

The steering-wheels of the form of bicycle known as the "Star," and also the steering-wheels of tricycles, (both front and rear steerers,) are smaller than the driving-wheels, being a little more than one-third as large, and consequently these small wheels in passing along the road follow the inequalities of its surface, and receive a considerable shock when a stone or other obstruction is encountered.

The object of my invention is to overcome these objectionable features, and to provide a steering-wheel that shall yield to a pressure produced by inequalities in the road or obstructions upon its surface, and thus lessen the jar that results from a rigid wheel.

My invention consists in the combination, with the steering-wheel, of a fork the head of which is inclined at an angle of about forty-five degrees and pivoted to the steering-bar, the head being extended above the pivot in the form of a hook, which is also above the steering-bar, and there is a spring between the head of the fork and the steering-bar, so that the steering-wheel can yield to obstructions by swinging upon the pivot of the fork, the spring being compressed, and then returning the parts to their normal position.

In the drawings, Figure 1 represents an elevation of a Star bicycle having my improvements applied to the steering - wheel, and Fig. 2 is a plan of part of the steering-wheel and the devices connected therewith, in larger size.

A is the main driving-wheel; B, the seat and its frame; C, the frame of the wheel; D, the steering-handles; E, the steering-rod, and F the steering - wheel. The steering-rod E passes through the sleeve $a$, and is continued forward over the steering-wheel as a short curved spine, $b$. The fork $c$ of the steering-wheel F is at an angle of about forty-five degrees, the head of the fork being in the direction of travel. The end of the spine $b$ is made as a fork or yoke, $b'$, and the head of the fork $c$ is made as a tubular pivot, $c'$, that is received into the yoke $b'$, and the parts are secured by a bolt, 1. The head of the fork is extended upwardly in the form of a hook or arm, $d$, and there is a link, $e$, passing through an opening in the spine $b$, and the upper end of said link is pivoted to the hook $d$, and the lower end to the bow-spring $f$, that is secured upon the under side of the spine $b$.

In this class of velocipedes very little weight comes on the steering-wheel; but the said wheel is subject to concussion from the inequalities of the road and from obstructions. By my improvement the machine and rider receive but little concussion, because the wheel F in passing over an obstruction yields and swings upon the pivot-bolt 1, compressing the spring $f$.

My aforesaid improvement is applicable to the steering-wheels of tricycles and tandems. In connection with the arm $c'$ any desired form of spring may be used, either above or below the spine, and such spring or springs may be connected to the spine $b$ in several ways, and be either bow-springs or helical or spiral springs.

I claim as my invention—

1. The combination, in a velocipede, with the wheels A and F, and the steering-handle D and rod E, of the curved spine $b$, the pivoted fork $c$ at a forward inclination, the arm $c'$ upon the fork, the link $e$, and spring $f$, substantially as specified.

2. The combination, with the driving and steering wheels of a bicycle or tricycle, of a fork for the steering - wheel placed at an angle of about forty-five degrees and having an arm, $c'$, a pivot connecting said fork to the spine, and a spring or springs to retain the parts in their relative position and yield to pressure against the wheel, substantially as and for the purposes set forth.

Signed by me this 7th day of September, A. D. 1885.

JOSEPH M. TRYON.

Witnesses:
HAROLD SERRELL,
GEO. T. PINCKNEY.